Jan. 28, 1936. H. HALLAM ET AL 2,028,832
APPARATUS FOR MOLDING SOLES
Filed April 5, 1933 2 Sheets-Sheet 2
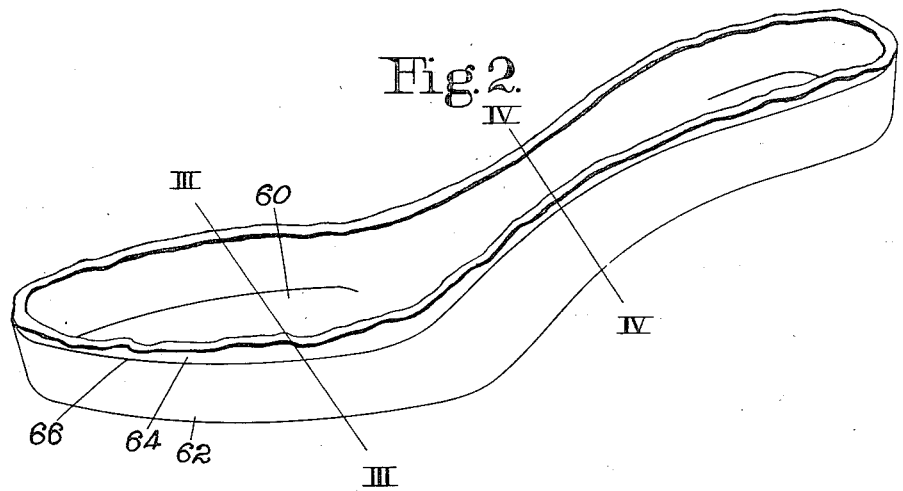
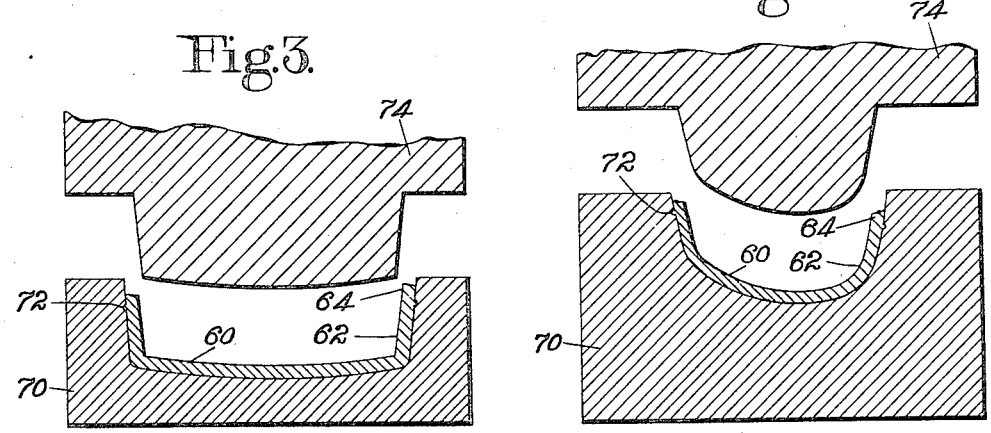
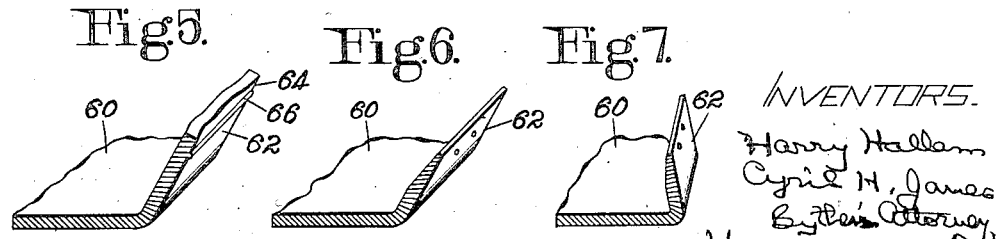

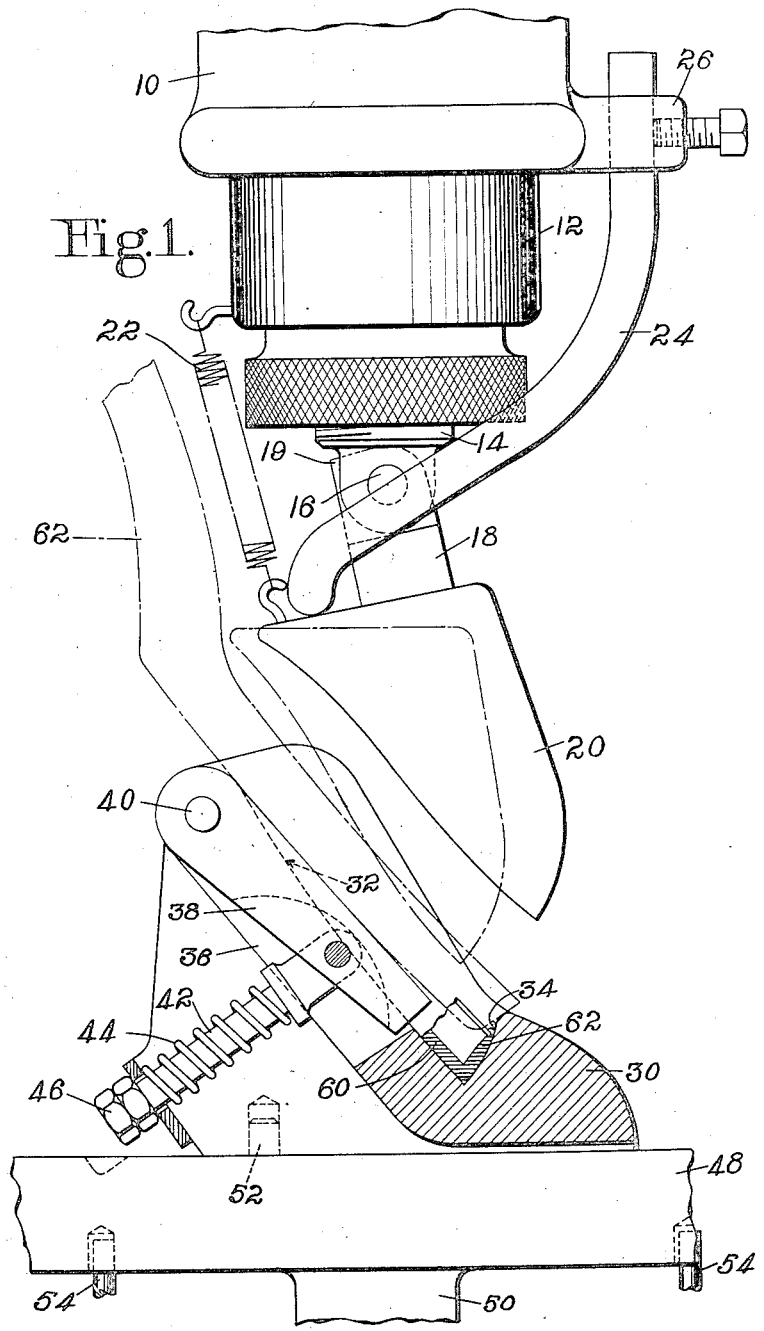

Patented Jan. 28, 1936

2,028,832

UNITED STATES PATENT OFFICE 2,028,832

APPARATUS FOR MOLDING SOLES

Harry Hallam and Cyril Harry James, Leicester, England, assignors to United Shoe Machinery Corporation, Paterson, N. J., a corporation of New Jersey Application April 5, 1933, Serial No. 664,646
In Great Britain May 26, 1932

13 Claims. (Cl. 12—21)

This invention relates to machines for shaping or molding soles for use in the manufacture of footwear. It consists in a novel machine having cooperating molds for imparting a supplementary or final molding step to a partially formed sole blank. An important field of use of the present invention is in connection with the manufacture of sandals or other shoes employing a sole having a peripheral flange molded therein and, for purposes of illustration, the invention will be described in its application to that field.

Sole blanks which are to form soles for footwear of this type have been shaped heretofore between cooperating molds to provide the blank with an upstanding peripheral flange and this has been disposed somewhat obliquely with respect to the plane of the sole and outwardly inclined to a greater or lesser extent. In the completed sandal, however, it is important that the upstanding flange of the sole should be inclined inwardly in order that it may closely follow the contour of the last particularly about the toe. In this region, the shape of the last on which the shoe is to be made recedes in contour from the outline of its tread surface, so that if the flanged margin of the sole is to hug the last in this locality the flange must have imparted to it an inward inclination carrying it within a line perpendicular to the tread face of the sole.

In the manufacture of sandals and footwear of the type in question, it is convenient to perform other operations upon the sole after it has been preliminarily molded as above explained and before it is fully prepared to be assembled with the upper. In the first place, it is important to trim the upper edge of the molded flange to a predetermined height with respect to the tread surface of the sole about its entire periphery. In many cases, it is also desired to bevel the edge of the flange by removing material from the inner wall thereof to reduce the thickness of the flange substantially to that of the upper to which it is to be united. In case the upturned flange of the sole is to be united to the upper by a lacing, it is also convenient to perform the operation of perforating the flange at this time and while it extends or may be bent in an outwardly-inclined relation to the sole bottom.

An important object of the present invention is to provide a novel molding equipment for imparting to the toe end of the flanged sole the inwardly-inclined position desired of the upturned flange after the beveling or perforating operations have been performed thereon and without detrimentally affecting either of these prior operations. These, as will be understood, may be most conveniently performed upon the sole before the flange has assumed or had imparted thereto an inturned relation to the tread of the sole blank for, if the attempt is made to perform these operations after the final molded shape has been imparted to the flanged sole, there is always danger that the molded flange will be distorted and the full benefit of the molding operation lost or impaired.

In another aspect, our invention comprises a novel molding machine which may be employed advantageously in carrying out the final molding operation above outlined. To this end, an important feature of my invention consists in an organized machine including a cavity mold having a molding surface bounded by an angularly-disposed wall and a cooperating convex mold movable in a path oblique to the molding surface and mounted for angular displacement. This construction not only brings about an improved molding operation upon the blank, but permits relative movement of the molds to a clearance position and thereby facilitates presentation to the machine of the blank to be molded. By arranging one of the molds for angular displacement, it may be caused to engage the tread portion of the sole blank first, thus substantially eliminating all tendency to draw material from the flange and thereby to lengthen the sole as a whole, and tending also accurately and positively to locate the blank preliminarily to the actual molding operation during which the inner mold may be angularly displaced toward the angularly disposed wall to mold the flange.

Another feature of our invention consists in a yielding gripping member which is preferably mounted within the cavity of the outside or concave mold and which is effective in controlling the position of the sole blank preliminarily to the molding operation. As herein shown, the convex mold is arranged to swing in a yielding manner so that it may act to engage the blank yieldingly in cooperation with said gripping member and then, as the two molds approach nearer and nearer to their final molding position, the yielding gripping member is depressed into a position coincident with the face of the cavity of the concave mold.

These and other features of the invention will be best understood and appreciated from the following description of a molding machine constituting a preferred embodiment thereof when read with reference to the accompanying drawings, in which Fig. 1 is a view of the molding machine in side elevation showing the cavity mold partly in section and representing also portions of a sole blank before and after treatment;

Fig. 2 is a view in perspective of a sole blank upon which the preliminary molding operation has been carried out;

Fig. 3 is a cross sectional view, on an enlarged scale, showing the sole in section on the line III—III of Fig. 2 in its relation to the molds by which it is formed;

Fig. 4 is a similar view showing the sole in section on the line IV—IV of Fig. 2 and the molds;

Fig. 5 is a fragmentary view of a portion of the sole shown in Fig. 2;

Fig. 6 is a similar view of the same portion of the sole after it has been trimmed, beveled and perforated; and Fig. 7 is a similar view of the same portion of the sole after it has been molded in the machine of Fig. 1.

In the drawings, the operative instrumentalities of the machine only are illustrated together with a small portion of the machine frame 10, which may be of any desired construction to support the molds in a position conveniently accessible to the operator and to furnish adequate support for actuating mechanism capable of moving the molds together with satisfactory molding pressure.

The frame 10 is provided with an overhanging portion in which is formed a vertical bore for a reciprocatory plunger 12 having a stem 14 threaded into and adjustably contained within its lower end. The threaded stem is provided with spaced ears for a transverse pivot pin 16 upon which is pivotally mounted the shank 18 of the convex or inside mold 20. This mold corresponds in shape to the toe end of a last and its exterior surfaces converge to an acute angle corresponding to the angle desired between the tread face of the sole and the upstanding peripheral flange which it is desired to mold about the toe portion thereof.

The inner corner 19 of the shank 18 of the mold 20 is square and the design of the pivotal connection of the shank with the plunger 12 is such that the square corner 19 acts as a positive stop to hold the shank in a vertical position in alignment with the axis of the plunger when the mold 20 is swung in a clockwise direction, as seen in Fig. 1, to the limit of its angular movement. A tension spring 22 extending between the rear surface of the mold 20 and the plunger 12 tends at all times to swing the mold in this direction and to seat the square corner of the shank 18 against the end face of the stem 14. It will be noted that the axis of the pivot pin 16 is offset with respect to the longitudinal vertical axis of the mold 20 which passes through its toe end and that the outer corner of the shank 18 is rounded so as to permit the mold to swing toward the right, as seen in Fig. 1, against the tension of the spring 22.

An adjustable stop is provided for swinging the mold 20 to a clearance position when the plunger occupies its initial or elevated position in the machine. The stop comprises a bent rod 24 which is adjustably mounted in a clamping ear 26 projecting outwardly from the frame 10. The stop rod 24 is curved so that its lower end stands in the path of movement of the rear or horizontal face of the mold 20 and engages the same as the plunger 12 is elevated to its initial position. Fig. 1 shows the mold 20 in this initial position, in which it is displaced 10 or 15° toward the right so that its toe end is slightly raised and swung out of the normal path of movement of the plunger.

The outside or cavity mold 30 is mounted in line with and beneath the convex mold 20 upon a plate or platform 48 having a downwardly-extending stem 50 by which the plate and mold are supported in a part of the frame (not shown) for slight rotary movement in order to accommodate any minor variations in the thickness of sole blanks presented to the machine and to allow the inner mold to seat the work in the mold cavity. Upwardly-projecting pins 54 on the frame enter short curved slots in the plate 48 and limit this accommodating movement. The cavity mold 30 is positioned upon the plate 48 by dowel pins 52, one of which is shown in Fig. 1.

The cavity of the mold 30 is formed by a bottom or tread-engaging wall 32 and a peripheral or flange-engaging wall 34, which define a cavity of the shape desired in the toe of the molded sole blank. The tread-engaging wall is disposed at an angle of about 30° to the vertical and the angle between this and the flange-engaging wall 34 is something less than a right angle.

The bottom or tread-engaging wall 32 of the mold 30 is provided with a longitudinal slot 36, in which is pivotally mounted a sole-engaging or gripping member 38. This member is pivoted to the mold by means of a transverse pivot pin 40 and is pivotally connected near its free end to a downwardly and outwardly-extending rod 42. The rod 42 passes outwardly through a transverse frame member and is provided with a compression spring 44, tending at all times to swing the sole-engaging member 38 upwardly into the cavity of the mold. At its outer end, the rod 42 carries adjustable stop nuts 46, which limit the outward movement of the member 38 and may be adjusted to vary its initial position in accordance with the requirements of the work. As shown in Fig. 1, the member 26 normally stands out with its free lower end pointing toward the upper edge of the flange-engaging wall of the mold cavity, being free to yield into the slot 36 against the compression of the spring 44 as the molds 20 and 30 approach their final molding position.

The preliminary steps in preparing a flanged sole blank for presentation to the machine shown in Fig. 1 are suggested in the figures of Sheet 2 of the drawings. A flat sole blank is properly located in a concave or female mold 70 which, if desired, may be of integral construction and which is provided with a cavity having upright side walls of the outside contour desired in the sole blank. Cooperating with the mold 70 is a convex or male mold 74 corresponding in contour to the shape of the mold 70 with allowance for the thickness of the sole blank. Fig. 3 represents the cross sectional contour of the molds 70 and 74 substantially at the ball line or slightly in advance thereof, and Fig. 4 the contour of the molds in the shank of the sole. A peripheral groove 72 is formed in the inner face of the side walls of the mold 70 at a predetermined height from the bottom or tread face thereof for the purpose of forming a gage mark, comprising a bead or rib in the outer wall of the flanged blank. In Figs. 3 and 4, the sole blank is shown in the molded shape which is imparted to it by the cooperative action of the molds 70 and 74. The tread portion 60 of the sole blank is conformed to the varying contour of the tread surface of the mold 70 and the margin of the blank is upturned in the form of a peripheral flange 62 coinciding in shape with the contour of the side walls of the mold. The gage mark or rib 66 extends about the outer surface of the flange 62 at a predetermined height from the tread face of the sole blank, marking off or defining a peripheral waste strip 64 which is of uneven height and which may be later trimmed from the molded sole blank.

A portion of the flanged blank as it comes from the molds 70 and 74 with the rib 66 formed in the outer surface of the flange 62 is shown in Fig. 5. Having brought the flanged sole blank to this stage, it is next trimmed in accordance with the gage mark or rib 66 and the waste strip 64 removed. The trimmed flange 62 is then beveled, preferably by removing material from the inside, so that its upper edge is reduced substantially to the thickness of the upper to which it is to be secured. If a lacing is to be used for this purpose, the trimmed and beveled flange 62 may also be perforated at this time. These and other preparatory steps may be carried out conveniently with the blank in this condition, that is to say, with the flange turned up and its limits determined but prior to imparting thereto its final molded shape. In carrying out such steps, the upturned flange may be temporarily deflected for convenience in handling without danger of losing the general lines imparted to the sole blank by the preliminary molding operation above discussed and the final shape then imparted to the blank, bringing it into substantially the condition shown in Fig. 7 by the use of the machine shown in Fig. 1.

In molding the toe end of a flanged sole blank, the sole 62, indicated by dot and dash lines in Fig. 1, is placed within the recess of the mold 30 with its outer tread flat against the gripping member 38 and with its toe end pointing toward the bottom of the mold cavity. As presented to the machine, the flange 62 will stand in substantially the condition shown in Fig. 6, that is to say, spreading slightly outwardly, and will rest with its toe end upon the upper edge of the mold cavity. The plunger 12 is then moved downwardly and the pointed toe end of the mold 20 brought into engagement with the inner face of the bottom 60 of the sole blank slightly forward of the point at which the tread surface rests against the gripping member 38. Further depression of the plunger 12 advances the mold 20 downwardly until its convex toe end is seated in the vertex of the angle between the bottom and the flange of the sole blank, and at the same time the sole blank as a whole is forced toward the tread face 32 of the mold cavity, pushing the gripping member 38 into its slot 36. During this positioning of the sole blank, the bottom 60 is gripped yieldingly between the gripping member 38 and the toe portion of the mold 20, so that the toe end thereof tends to remain in the flanged sole blank and to reach with certainty the vertex of the angle between the bottom and the flange of the sole blank. After the toe end of the inside mold 20 engages the vertex of the angle at the base of the flange and clamps the sole against the member 38, the actual molding action upon the flange begins, the flange being dragged by further descent of the mold 20 across the upper edge of the mold cavity toward the tread surface 32 of the mold 30 and downwardly into the somewhat acute angle at the bottom of the mold cavity, being eventually molded into the condition shown in Figs. 1 and 7 wherein the upstanding flange 62 makes an acute angle with the surface of the sole bottom 60, it being understood that a component of molding pressure is directed toward the flange not only because of the inclination of the mold surface 32 but also because the pin 16 is offset rearwardly with respect to the end of the inner mold.

By providing a construction for carrying out the molding operation in the manner above described, any tendency for the inside mold 20 to force its point over the flange 62 of the sole blank is minimized and all tendency to rob material from the flange, and thereby to lengthen the sole as a whole, is practically eliminated. The result is, accordingly, to produce an accurately molded sole blank in which the flange is of exactly the desired height and molded to exactly the angle desired and most convenient for the ensuing shoemaking steps. One type of footwear for which the flanged sole produced as above outlined may be used with particular advantage is in the so-called Sahara sandal, shown for example in British Patent No. 248,242, although with appropriate modification the apparatus and method of procedure herein set forth may be employed in the production of flanged sole blanks of other characteristics adapted for footwear of other types.

Having thus described our invention, what we claim as new and desire to secure by Letters Patent is:

1. A molding machine having, in combination, a concave mold, a convex mold movable in a straight line path toward and from the concave mold, and means comprising a fixed arm arranged to engage the mold during its straight line movement for swinging said convex mold transversely when it has been retracted from the concave mold, for the purpose of increasing the clearance between the two molds.

2. A molding machine having, in combination, an outer mold having faces converging at an interior angle, a cooperating inner mold having faces converging at a corresponding exterior angle, means for supporting said inner mold for pivotal movement about an axis offset with respect to a plan parallel to the direction of relative movement of the mold and passing through the apex of the angle between the converging faces, and means for moving the inner mold toward the outer mold, the pressure of said axis tending to force one face of the angle of the inner mold against the corresponding face of the outer mold.

3. A molding machine having, in combination, a concave mold, a relatively movable convex mold, a plunger for supporting and carrying the convex mold and to which the latter is pivotally connected, means for transversely displacing the convex mold when the plunger is moved into its initial position, and a spring for restoring said mold to operative position when the plunger has moved a predetermined distance from its initial position.

4. A molding machine having, in combination, an outside mold, a plunger movable from a remote initial position toward said mold, an inside mold pivotally mounted thereon and arranged to be displaced laterally to a clearance position in the initial position of the plunger, yielding means tending at all times to restore said inside mold to its operative position, and an adjustable stop to determine where, in the stroke of the plunger, said inside mold is so moved.

5. A molding machine having, in combination, a frame supporting an outside mold and supplying ways for a reciprocatory plunger, an inside mold pivoted to the plunger for swinging movement in one direction, connections for positively limiting the pivotal movement of the inside mold in one direction, a spring tending to hold said inside mold in the position thus determined, and an adjustable stop acting to swing said mold on its pivot in the other direction as the plunger is retracted.

6. A molding machine having, in combination, a mold with a cavity shaped to receive the toe end of a flanged sole blank presented with its tread face inclined from the vertical, said mold having a correspondingly inclined wall with a yielding element extending from said tread face into the mold cavity, and a toe end mold movable into said mold cavity first to position the blank against the inclined wall of the mold cavity against the action of said yielding element, then to exert a downward pressure thereon and finally to exert a toeward pressure to shape the blank to the contour of the mold cavity.

7. A molding machine having, in combination, a mold with a cavity shaped to receive the toe end of a flanged sole blank presented with its tread face obliquely disposed, said mold having an inclined wall for engaging the tread face of the blank, and a vertically reciprocating plunger having a toe end mold pivotally connected thereto at one side of a vertical plane passing through the toe end of the toe end mold, the tread-engaging surface of the toe end mold being maintained parallel to the inclined wall of the mold cavity during a part of the working stroke of the plunger and being crowded against the flange by final pressure of the pivot.

8. A molding machine having, in combination, an outside mold having an oblique tread-engaging wall, a reciprocatory plunger movably mounted above the outside mold, an inside mold pivotally mounted upon said plunger, and a fixed arm arranged to engage the inside mold when the plunger is retracted to swing the lower end of said inner mold away from the tread-engaging wall of the outside mold to provide clearance for removal and insertion of the work.

9. A molding machine having, in combination, a reciprocatory plunger having a toe end mold mounted thereon, a mold having a correspondingly shaped cavity located in line with said plunger, said cavity mold being mounted for limited turning movement about an axis substantially in line with the path of the plunger to accommodate itself to variations in the thickness of the blank to be molded.

10. A molding machine having, in combination, a flanged outer mold to receive a flanged sole blank, said outer mold having a yielding gripping member projecting from its molding face, and an inner mold mounted first to press the blank against said gripping member to engage the blank yieldingly and then to move longitudinally of said outer mold to press the flange of the sole blank against the flange of the outer mold.

11. A molding machine having, in combination, an outside mold formed with a cavity to receive the toe end of a flanged sole, a gripping member yieldingly projecting into the mold cavity, a reciprocatory plunger mounted for movement toward and from the outside mold, and a toe end mold pivotally mounted thereon and yieldingly urged toward said gripping member to control therewith the position of the blank during a part of the movement of the plunger toward the outside mold, said pivoted mold being urged toward the flange by the final pressure of the plunger.

12. A molding machine having, in combination, a male mold adapted to fit within the margin of a flanged sole blank, a female mold corresponding in outline to the contour of the male mold and having molding surfaces relatively inclined at less than a right angle, means for causing relative approach of said molds, an intermediate member pivoted to the female mold at a substantial distance from the toe end of the mold with its free end engaging the toe portion of the sole blank, and a spring acting on said member to urge the sole blank placed between the molds transversely against the male mold during the approaching movement of the molds.

13. A molding machine having, in combination, cooperating molds shaped to mold a flanged sole blank between them, one of said molds having faces meeting at an acute angle and carrying a spring-actuated member adapted to maintain the interior face of the sole blank in contact with the other mold while the corner edge between said interior face and the upstanding flange at the toe is being moved into the angle between said faces.

HARRY HALLAM.
CYRIL HARRY JAMES.

CERTIFICATE OF CORRECTION.

Patent No. 2,028,832.　　　　　　　　　　　　　　　　　　January 28, 1936.

HARRY HALLAM, ET AL.

It is hereby certified that error appears in the printed specification of the above numbered patent requiring correction as follows: Page 1, second column, line 21, for the syllable "structure" read struction; page 3, second column, line 50, claim 2, for "plan" read plane; and that the said Letters Patent should be read with these corrections therein that the same may conform to the record of the case in the Patent Office.

Signed and sealed this 7th day of April, A. D. 1936.

Leslie Frazer

Acting Commissioner of Patents.

(Seal)